Patented Oct. 30, 1951

2,573,606

UNITED STATES PATENT OFFICE 2,573,606

LOWER ALKYL AND ALKENYL N-(1-NAPHTHYL METHYL) N-HYDROXYETHYL AMINES

George Rieveschl, Jr., Grosse Pointe Woods, and William R. Coleman, Grosse Pointe, Mich., assignors to Parke, Davis & Company, Detroit, Mich., a corporation of Michigan No Drawing. Application December 2, 1946, Serial No. 713,462

7 Claims. (Cl. 260—570.9)

This invention relates to a new class of tertiary amines and to methods for obtaining the same. More specificaly, the invention relates to substitued β-hydroxy alkyl naphthylmethyl amines and their acid addition salts. The free bases of the compounds of the present invention have the formula,

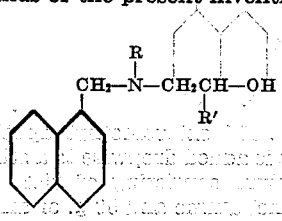

where R is a lower alkyl or lower alkenyl radical and R' is hydrogen or methyl.

In accordance with the invention the new tertiary amines may be obtained as the free base having the formula given above or as an acid addition salt of the base with an inorganic or organic acid. Some examples of the salts which may be prepared by the methods hereinafter described are the hydrochloride, hydrobromide, hydroiodide, sulfate, sulfamate, phosphate, acetate, citrate, oxalate, succinate, benzoate, tartrate, phthalate, maleate, oleate and the like.

It has been found that the compounds of the present invention may be obtained by several different methods. For example, they may be prepared by the reaction of a 1-halomethylnaphthalene with an alkyl or alkenyl β-hydroxyalkyl amine preferably in an inert organic solvent such as benzene, toluene or xylene. A modification of this process involves the use of an alkaline material to react with the mineral acid formed during the reaction. When the reaction is carried out in the presence of such materials a smaller quantity of amine is required since the amine is not removed from the reaction by salt formation. In general, when no acid binding agent is employed it is preferable to use about two or more equivalents of amine for each equivalent of 1-halomethylnaphthalene. Some of the alkaline substances which may be used in the process are alkali metal hydroxides, oxides, alcoholates, carbonates, bicarbonates, acetates and the like. The alkaline earth metal hydroxides, oxides and carbonates, as well as tertiary organic bases such as pyridine, quinoline and the like may also be used.

Alternatively, an alkyl or alkenyl 1-naphthylmethyl amine can be reacted with a β-hydroxyalkyl halide under substantially the same conditions as described above for the reaction of a 1-naphthylmethyl halide with an alkyl or alkenyl β-hydroxyalkyl amine. Still another method for obtaining these new tertiary amino alcohols consists in alkylating a β-hydroxyalkyl 1-naphthylmethyl amine with an alkyl or alkenyl halide under conditions similar to those set forth above. Another excellent method which may be employed in the preparation of these valuable new products consists in reacting ethylene oxide or 1,2-propylene oxide with an alkyl or alkenyl 1-naphthylmethyl amine in an organic solvent such as methanol, ethanol, benzene, toluene, xylene, dioxane and the like which contains a trace or a small amount of water.

These various processes may be diagrammatically illustrated as follows:

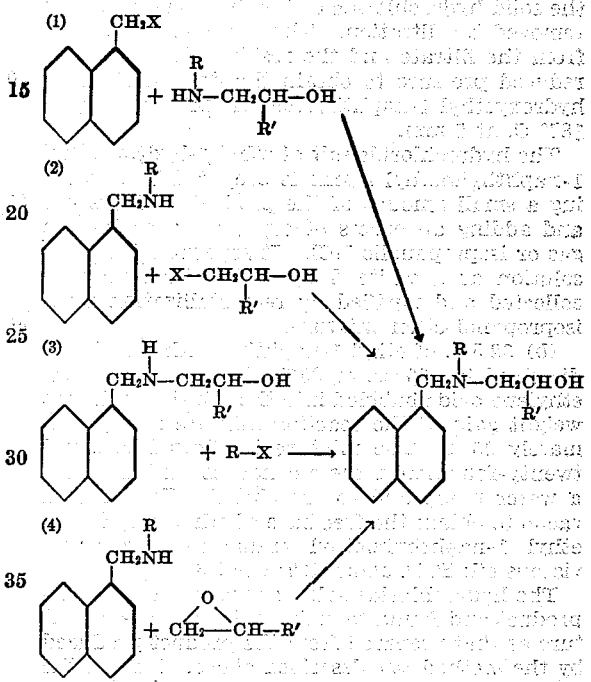

where R and R' have the same significance given above and X is chlorine or bromine.

The substituted β-hydroxyalkyl 1-naphthylmethyl amines and their acid addition salts are useful in the preparation of other organic compounds and find particular use in the preparation of sympatholytic and antihistamine agents.

The invention is illustrated by the following examples.

*Example 1.—Methyl β-hydroxyethyl 1-naphthylmethyl amine*

$$\text{CH}_2\text{—N(CH}_3\text{)—CH}_2\text{CH}_2\text{OH}$$

88.3 g. of 1-chloromethylnaphthalene dissolved in 100 cc. of benezene is added with stirring to a mixture consisting of 37.5 g. of N-methyl ethanol amine and 69 g. of anhydrous potassium carbonate in 100 cc. of benzene. After the addition is complete the mixture is refluxed for five hours, cooled and filtered. The benzene is distilled from the filtrate, the residue distilled under reduced pressure and the fraction boiling at 172° C. at 5 mm. which consists of the desired methyl β-hydroxyethyl 1-naphthylmethyl amine collected.

*Example 2.—Ethyl β-hydroxyethyl 1-naphthylmethyl amine*

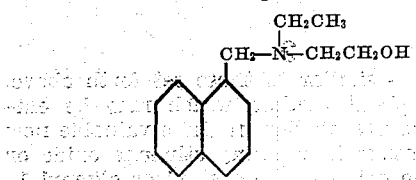

(a) 88.3 g. of 1-chloromethylnaphthalene dissolved in 100 cc. of benzene is added dropwise with stirring to a solution of 89.1 g. of N-ethyl ethanolamine in 100 cc. of benzene. After the addition has been completed the mixture is refluxed for four and one-half hours, cooled and the solid hydrochloride of N-ethyl ethanol amine removed by filtration. The benzene is distilled from the filtrate and the residue distilled under reduced pressure to obtain the desired ethyl β-hydroxyethyl 1-naphthylmethyl amine boiling at 187° C. at 5 mm.

The hydrochloride salt of ethyl β-hydroxyethyl 1-naphthylmethyl amine is prepared by dissolving a small amount of the product in dry ether and adding an excess of dry hydrogen chloride gas or isopropanolic HCl. It separates from the solution as a white fluffy solid which may be collected and purified by recrystallization from isopropanol-ether mixture.

(b) 92.5 g. of ethyl 1-naphthylmethyl amine is dissolved in 300 cc. of 95% alcohol and gaseous ethylene oxide bubbled into the solution until the weight gain of the reaction mixture is approximately 25 g. The mixture is allowed to stand twenty-four hours, the alcohol distilled off using a water pump and the residue distilled in high vacuo to obtain the free base of ethyl β-hydroxyethyl 1-naphthylmethyl amine as a colorless viscous oil; B. P. about 187° C. at 5 mm.

The hydrochloride salt was prepared from this product and found to melt at the same temperature as that prepared from the product produced by the method (a) described above. Mixing the hydrochloride salts produced by methods (a) and (b) did not depress the melting points.

*Example 3.—n-Propyl β-hydroxyethyl 1-naphthylmethyl amine*

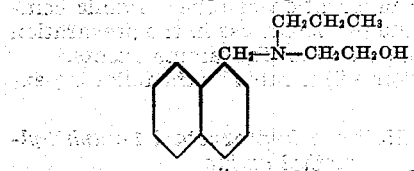

A mixture consisting of 39.1 g. of N-n-propyl ethanol amine, 58.9 g. of 1-chloromethylnaphthalene and 50 g. of anhydrous potassium carbonate in 100 cc. of dry xylene is refluxed for about 20 hours. The mixture is treated with 250 cc. of water, the organic layer separated and after dilution with ether extracted with an excess of dilute hydrochloric acid. The aqueous extracts are made alkaline with sodium hydroxide solution and the amine which separates extracted with ether. The ether extracts are dried over potassium carbonate, the drying agent removed by filtration and the ether evaporated. The residue is distilled under reduced pressure to obtain the desired n-propyl β-hydroxyethyl 1-naphthylmethyl amine as a colorless oil.

The free base may be converted to an acid addition salt such as the hydrobromide by dissolving it in dry ether and adding an excess of an absolute alcohol solution of hydrogen bromide. The hydrobromide salt which separates from the solution is collected and purified by recrystallization from isopropanol-ethyl acetate mixture.

*Example 4.—Iso-propyl β-hydroxyethyl 1-naphthylmethyl amine*

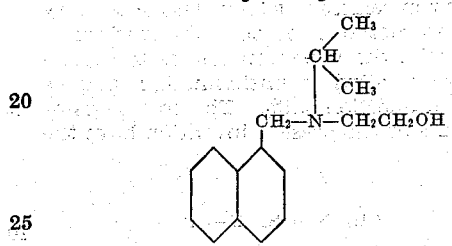

(a) 58.9 g. of 1-chloromethylnaphthalene in 50 cc. of xylene is added dropwise to a stirred and refluxing mixture consisting of 35.1 g. of N-isopropyl ethanol amine and 50 g. of anhydrous potassium carbonate in 100 cc. of xylene. After the addition has been completed, the mixture is refluxed overnight (about 16 hours), cooled and poured into about 400 cc. of cold water. The organic layer is separated, washed with water and then extracted with an excess of dilute hydrochloric acid. The acidic extracts are made alkaline with 10 N sodium hydroxide solution and the free base extracted with ether. The ether extracts are dried, the ether evaporated and the residue distilled under reduced pressure to obtain the desired iso-propyl β-hydroxyethyl 1-naphthylmethyl amine boiling at 139–41° C. at less than 1 mm.

(b) 99 g. of iso-propyl 1-naphthylmethyl amine is dissolved in about 300 cc. of stock benzene and ethylene oxide bubbled into the solution until the weight gain of the reaction mixture is approximately 25 g. The benzene is removed by distillation and the residue distilled in vacuo to obtain the free base of iso-propyl β-hydroxyethyl 1-naphthylmethyl amine boiling at approximately 140° C. at 0.8 mm.

*Example 5.—Allyl β-hydroxyethyl 1-naphylmethyl amine*

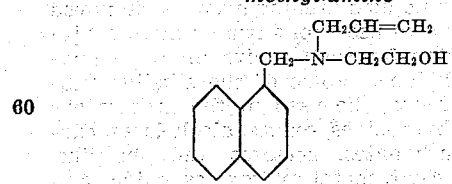

(a) Gaseous ethylene oxide is bubbled into a solution of 49 g. of allyl 1-naphthylmethyl amine in 150 cc. of 95% methanol until the weight gain of the reaction is about 12 g. The mixture is allowed to stand for one day and then the methanol removed by distillation. The residue is distilled under reduced pressure to obtain the free base of allyl β-hydroxyethyl 1-naphthylmethyl amine as a colorless oil; B. P. about 144–46° C. at 0.2 mm.

(b) 33.7 g. of N-allyl ethanol amine is dissolved in 100 cc. of dry xylene. 50 g. of anhydrous potassium carbonate is added and the mixture heated to reflux. 58.9 g. of 1-chloromethylnaphthalene is added slowly to the stirred and refluxing mixture and after the addition is completed the reaction mixture is maintained at a temperature of 100° C. for about 20 hours. The mixture is cooled, poured into 400 cc. of cold water and the organic layer separated. After dilution with ether and washing, the organic layer is extracted with an excess of dilute hydrochloric acid, the acidic extracts made alkaline with 10 N sodium hydroxide solution and the free base which separates extracted with ether. The combined ether extracts are dried, the ether evaporated and the residue distilled in vacuo to obtain the desired allyl β-hydroxyethyl 1-naphthylmethyl amine boiling at 144–146.5° C. at 0.2 mm. This product is identical with the product obtained by method (a) above.

The acid oxalate salt of this compound may be prepared by dissolving 5 g. of the product in 15 cc. of nitromethane and adding to this solution 15 cc. of a hot solution containing one equivalent of oxalic acid hydrate. By cooling the resultant solution the crystalline acid oxalate salt of allyl β-hydroxylethyl 1-naphthylmethyl amine is obtained.

*Example 6.—n-Butyl β-hydroxyethyl 1-naphthylmethyl amine*

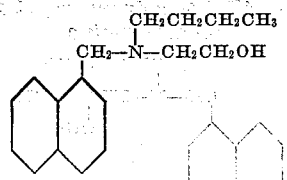

88.3 g. of 1-chloromethylnaphthalene in 100 cc. of benzene is added dropwise to a stirred and refluxing mixture consisting of 58.5 g. of N-n-butyl ethanol amine and 69 g. of anhydrous potassium carbonate in 150 cc. of benzene. After the addition has been completed, the mixture is refluxed for four hours, cooled and the salt removed by filtration. The benzene is distilled off and the residue distilled in vacuo to obtain the desired n-butyl β-hydroxyethyl 1-naphthylmethyl amine; B. P. 187–8° C. at 5 mm.

This same compound can also be prepared by bubbling gaseous ethylene oxide into a 95% alcohol or wet benzene solution containing 53 g. of n-butyl 1-naphthylmethyl amine until the weight gain of the reaction mixture is about 12 g. After allowing the mixture to stand for awhile, the solvent is distilled off and the residue distilled under reduced pressure to obtain the tertiary amino alcohol.

The citrate salt of n-butyl β-hydroxyethyl 1-naphthylmethyl amine is obtained by treating a dry ether solution of the base with an excess of citric acid dissolved in ether. The salt which separates from the solution as a finely divided powder is collected and purified by washing with several portions of dry ether.

*Example 7.—Iso-butyl β-hydroxyethyl 1-naphthylmethyl amine*

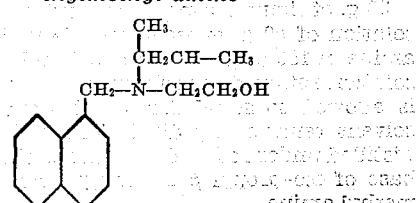

58.9 g. of 1-chloromethylnapthalene in 50 cc. of xylene is added dropwise to a stirred and refluxed mixture consisting of 39.1 g. of N-iso-butyl ethanol amine, 30 cc. of pyridine and 100 cc. of xylene. After the addition has been completed, the mixture is refluxed for four hours, cooled and poured into 500 cc. of cold water. The organic layer is diluted with ether, removed and washed with water. This layer is then extracted with an excess of dilute hydrochloric acid, the acidic extracts made alkaline with 10 N sodium hydroxide solution and extracted with ether. The combined ether extracts are dried, the ether evaporated and the residue distilled in vacuo to obtain the desired iso-butyl β-hydroxyethyl 1-naphthylmethyl amine; B. P. 153–4° C. at 0.6 mm.

This same compound may be obtained by substituting an equivalent amount (73.3 g.) of 1-bromomethylnapthalene for the 1-chloromethylnaphthalene used in the above procedure.

*Example 8.—Sec.-butyl β-hydroxyethyl 1-naphthylmethyl amine*

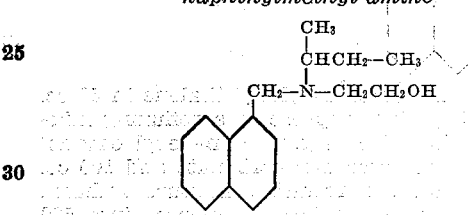

58.9 g. of 1-chloromethylnaphthalene dissolved in 50 cc. of xylene is added slowly to a refluxing mixture composed of 39.1 g. of N-sec.-butyl ethanol amine and 50 g. of potassium carbonate in 100 cc. of xylene. After the addition has been completed, the mixture is heated overnight, cooled and poured into 400 cc. of cold water. The organic layer is diluted with ether, extracted with an excess of dilute hydrochloric acid and made alkaline with 10 N potassium hydroxide solution. The free base which separates is extracted with ether, the ether extracts dried and the ether distilled. The residue is distilled under reduced pressure and the fraction boiling at 173–80° C. at 2.5 mm. which consists of sec.-butyl β-hydroxyethyl 1-naphthylmethyl amine, collected.

*Example 9.—n-Amyl β-hydroxyethyl 1-naphthylmethyl amine*

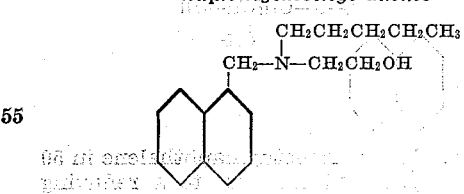

(a) 57 g. of n-amyl 1-naphthylmethyl amine is dissolved in 150 cc. of 95% alcohol and gaseous ethylene oxide bubbled into the solution until the gain in weight of the reaction mixture is about 12 g. The mixture is allowed to stand overnight, the alcohol distilled and the residue distilled under vacuo to obtain the desired product; B. P. about 165° C. at 0.8 mm.

(b) This compound may also be obtained by the reaction of 1-chloromethylnaphthalene with N-n-butyl ethanol amine. This is carried out as follows:

58.3 g. of 1-chloromethylnaphthalene in 50 cc. of xylene is added dropwise to a refluxing mixture consisting of 43.7 g. of N-n-butyl ethanol amine, 30 cc. of pyridine and 100 cc. of xylene. After the addition has been completed, the mixture is refluxed for six hours, cooled and treated with 500 cc. of water. The organic layer is separated, extracted with an excess of dilute hydrochloric acid and the aqueous extracts made alkaline with sodium hydroxide solution. (The hydrochloride of the desired product is not very soluble in water and to avoid using large quantities of acid during the acid extraction of the organic layer, the oily hydrochloride phase is added to the aqueous extracts before neutralization.) The free base of the amino alcohol which separates is extracted with ether, the ether extracts dried and the ether evaporated. The residue is distilled under reduced pressure to obtain the n-amyl β-hydroxyethyl 1-naphthylmethyl amine as a colorless, viscous oil; B. P. 163–6° C. at 0.7 mm.

*Example 10.—n-Hexyl β-hydroxyethyl 1-naphthylmethyl amine*

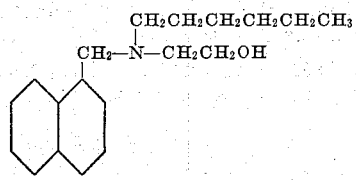

58.9 g. of 1-chloromethylnaphthalene in 50 cc. of xylene is added dropwise to a refluxing mixture consisting of 48.4 g. of N-n-hexyl ethanol amine, 50 g. of potassium carbonate and 100 cc. of xylene and the resulting mixture refluxed overnight. The cool mixture is poured into 500 cc. of water and the organic layer separated after dilution with ether. The organic layer is extracted with an excess of dilute hydrochloric acid, the aqueous extracts made alkaline with 10 N sodium hydroxide solution and the free base extracted with ether. (Since the hydrochloride salt of the desired product is quite insoluble in water, it separates out as an oil during the acid extraction. This oil layer is combined with the acidic aqueous extracts.) The ether extracts are dried, the ether distilled and the residue distilled under reduced pressure to obtain the desired n-hexyl β-hydroxyethyl 1-naphthylmethyl amine as a viscous oil; B. P. 163–70° C. at 0.55 mm.

*Example 11.—Ethyl β-hydroxypropyl 1-naphthylmethyl amine*

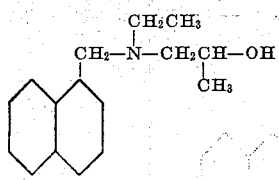

(a) 58.9 g. of 1-chloromethylnaphthalene in 50 cc. of xylene is added dropwise to a refluxing solution of 34.4 g. of N-ethyl iso-propanol amine and 30 cc. of pyridine in 100 cc. of xylene. After the addition has been completed, the solution is refluxed for four hours, cooled and poured into 500 cc. of cold water. The organic layer is diluted with ether, separated and extracted with an excess of dilute hydrochloric acid. The acidic aqueous extracts are made alkaline with 10 N sodium hydroxide solution, the free base extracted with ether and the ether extracts dried over potassium carbonate. The drying agent is removed by filtration, the ether evaporated and the residue distilled under reduced pressure to obtain the ethyl β-hydroxypropyl 1-naphthylmethyl amine boiling at 138–40° C. at 0.6 mm.

(b) A mixture consisting of 157 g. of β-hydroxypropyl 1-naphthylmethyl amine and 55 g. of ethyl bromide in 500 cc. of benzene is refluxed for three hours and then allowed to stand overnight. 500 cc. of 5 N sodium hydroxide solution is added and the organic layer separated. The organic layer is washed with water and extracted with an excess of dilute hydrochloric acid. The acidic aqueous extracts are made alkaline with sodium hydroxide solution, extracted with ether and the combined ether extracts dried over potassium carbonate. The drying agent is removed by filtration, the ether evaporated and the residue distilled under reduced pressure (about 1 mm. or less) in an efficient distillation apparatus to obtain the desired ethyl β-hydroxypropyl 1-naphthylmethyl amine.

Alternatively, the desired tertiary amine may be obtained from the residue remaining after evaporation of the ether by treatment of the residue with an excess of benzene sulfonyl chloride and aqueous alkali. The insoluble benzene sulfonamide of the starting material is filtered out as completely as possible and washed with water and then a small amount of dilute hydrochloric acid. The acidic washings are made alkaline and combined with the main filtrate and the mixture extracted with ether. The ether extracts are dried and the ether evaporated to obtain substantially pure ethyl β-hydroxypropyl 1-naphthylmethyl amine.

*Example 12.—Allyl β-hydroxypropyl 1-naphthylmethyl amine*

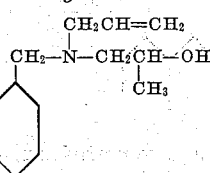

111 g. of 1-bromomethylnaphthalene in 100 cc. of benzene is added dropwise with stirring to a refluxing solution of 120 g. of N-allyl iso-propanol amine in 150 cc. of benzene, the resulting mixture refluxed for six hours, cooled and allowed to stand overnight. The hydrobromide salt of N-allyl iso-propanol amine is removed by washing the reaction mixture with 750 cc. of water and the benzene solution containing the free base of the desired product dried over potassium carbonate. The benzene is distilled off and the residue distilled under reduced pressure (at about 1 mm. or less) to obtain the allyl β-hydroxyethyl 1-naphthylmethyl amine as a colorless viscous oil.

*Example 13.—Iso-propyl β-hydroxypropyl 1-naphthylmethyl amine*

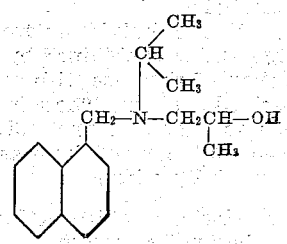

30 g. of liquid 1,2-propylene oxide is added to a solution of 99 g. of iso-propyl 1-naphthylmethyl amine in 150 cc. of 95% alcohol and the resulting solution refluxed for fifteen hours. The mixture is allowed to stand for twenty-four hours, the solvent removed by distillation and the residue distilled under reduced pressure to obtain the free base of iso-propyl β-hydroxypropyl 1-naphthylmethyl amine.

The 1-halomethylnaphthalenes used as starting materials in the practice of the present invention may be prepared from naphthalene by processes well-known in the art, for example, by chloro or bromo methylation. The alkyl or alkenyl 1-naphthylmethyl amines also used as starting materials may be obtained by treatment of a 1-halomethylnaphthalene with an excess of an appropriate primary alkyl or alkenyl amine. For example, the iso-propyl 1-naphthylmethyl amine which is used in Example 4b is prepared by refluxing a solution of 1-chloromethylnaphthalene with about three to four equivalents iso-propyl amine in absolute alcohol for a few hours. The alcohol is distilled off and the residue treated with water. Ether is added, the ether layer separated and extracted with several portions of dilute hydrochloric acid. The acidic aqueous extracts are made alkaline in the cold with 10% sodium hydroxide solution and the free base extracted with ether. The ether extracts are dried, the ether evaporated and the residue distilled under reduced pressure to obtain the desired iso-propyl 1-naphthylmethyl amine.

What we claim as our invention is:

1. A compound of the class consisting of a free base and its acid addition salts, said free base having the formula,

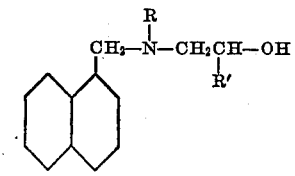

where R is a member of the class consisting of lower alkyl and lower alkenyl radicals and R' is a member of the class consisting of hydrogen and methyl.

2. A compound of the formula,

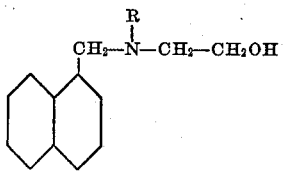

where R is a lower alkyl radical.

3. A compound of the formula,

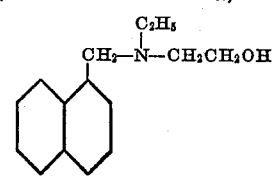

4. A compound of formula,

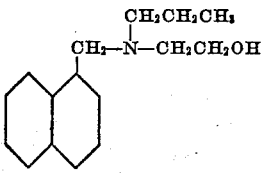

5. A compound of formula,

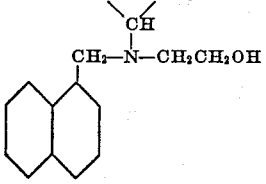

6. A compound of the formula,

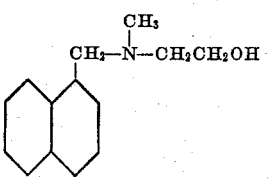

7. A compound of the formula,

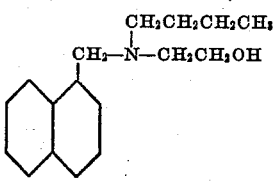

GEORGE RIEVESCHL, JR.
WILLIAM R. COLEMAN.

REFERENCES CITED

The following references are of record in the file of this patent:

UNITED STATES PATENTS

| Number | Name | Date |
|---|---|---|
| 1,949,247 | Eisleb | Feb. 27, 1934 |
| 2,114,122 | Bruson | Apr. 12, 1938 |

FOREIGN PATENTS

| Number | Country | Date |
|---|---|---|
| 456,534 | Great Britain | Nov. 11, 1936 |
| 131,529 | Japan | Aug. 7, 1939 |
| 204,708 | Switzerland | Sept. 1, 1939 |

OTHER REFERENCES

Wedekind: "Ann.," 471, pp. 73–112 (1929).